(12) United States Patent
Lu

(10) Patent No.: US 7,583,391 B2
(45) Date of Patent: Sep. 1, 2009

(54) THREE-DIMENSIONAL MEASURING APPARATUS, THREE-DIMENSIONAL MEASURING METHOD, AND THREE-DIMENSIONAL MEASURING PROGRAM

(75) Inventor: Cunwei Lu, Fukuoka (JP)

(73) Assignee: School Juridical Person of Fukuoka Kogyo Daigaku, Fukuoka (JP)

( * ) Notice: Subject to any disclaimer, the term of this patent is extended or adjusted under 35 U.S.C. 154(b) by 48 days.

(21) Appl. No.: 11/667,767

(22) PCT Filed: Oct. 24, 2005

(86) PCT No.: PCT/JP2005/019511

§ 371 (c)(1),
(2), (4) Date: May 15, 2007

(87) PCT Pub. No.: WO2006/054425

PCT Pub. Date: May 26, 2006

(65) Prior Publication Data

US 2008/0130015 A1 Jun. 5, 2008

(30) Foreign Application Priority Data

Nov. 19, 2004 (JP) ............................. 2004-336554

(51) Int. Cl.
*G01B 11/30* (2006.01)
(52) U.S. Cl. ................. 356/601; 356/603; 356/610
(58) Field of Classification Search .......... 356/600–640
See application file for complete search history.

(56) References Cited

U.S. PATENT DOCUMENTS 4,030,830 A * 6/1977 Holly .......................... 356/489
5,102,223 A * 4/1992 Uesugi et al. ............... 356/607
5,428,447 A * 6/1995 Toida ......................... 356/601

(Continued)

FOREIGN PATENT DOCUMENTS

| JP | 3-289505 | 12/1991 |
| JP | 2004-77290 | 3/2004 |

OTHER PUBLICATIONS

Shibata et al., "3D Human Body Measurement System", 3D Camera Team, Japan Science and Technology Agency (and English language abstract thereof).

(Continued)

*Primary Examiner*—Gregory J Toatley, Jr.
*Assistant Examiner*—Jarreas C Underwood
(74) *Attorney, Agent, or Firm*—Wenderoth, Lind & Ponack, L.L.P.

(57) ABSTRACT

A three-dimensional measuring apparatus, method, and program for acquiring many pieces of information on a pattern of light by a single projection and highly accurate three-dimensional information at high speed. The three-dimensional measuring apparatus comprises a pattern projector serving as projecting means for projecting a pattern of light onto a measurement object, a camera serving as imaging means for capturing an image of the measurement object illuminated with the pattern of light, and a computer for processing data on the image captured by the camera. The computer computes the direction angle of each individual pattern of light which forms the projected pattern of light from the intensity value of the projected pattern of light detected from the captured image, divides the intensity distribution, and computes the depth distance from the phase value at each measuring point of the divided pattern. Thus, highly accurate three-dimensional information is acquired.

16 Claims, 9 Drawing Sheets

U.S. PATENT DOCUMENTS

| | | | |
|---|---|---|---|
| 6,100,990 A * | 8/2000 | Ladewski | 356/445 |
| 6,141,105 A * | 10/2000 | Yahashi et al. | 356/623 |
| 6,373,963 B1 * | 4/2002 | Demers et al. | 382/108 |
| 6,549,289 B1 * | 4/2003 | Ellis | 356/603 |
| 6,988,660 B2 * | 1/2006 | Tsikos et al. | 235/454 |
| 2001/0031073 A1 * | 10/2001 | Tajima | 382/118 |
| 2003/0067537 A1 * | 4/2003 | Myers | 348/47 |
| 2003/0174880 A1 * | 9/2003 | Sakamoto et al. | 382/154 |

OTHER PUBLICATIONS

Cho et al., "3-D Image Measurement Techniques by Combination of MPCA and OIMP for Improvement of the Measurement Efficiency", Faculty of Engineering, Fukuoka Institute of Technology (and English language abstract thereof).

* cited by examiner

THREE-DIMENSIONAL MEASURING APPARATUS, THREE-DIMENSIONAL MEASURING METHOD, AND THREE-DIMENSIONAL MEASURING PROGRAM

BACKGROUND OF THE INVENTION

1. Technical Field

The present invention relates to a three-dimensional measuring apparatus, method, and program for projecting a predetermined pattern of light onto an object for non-contact measurement of three-dimensional information.

2. Background Art

In a variety of fields such as medical care, beauty care, apparel design of clothes as well as shoes, eye glasses, or hats, diet control, and health care, in recent years there have been demands for acquiring three-dimensional shape data not only regarding the torso but also regarding the entire human body including the face, the head and the limbs. Thus, expectations are placed on the development of an apparatus for non-contact high-speed measurements of three-dimensional shapes.

Three-dimensional measurement techniques are divided into two types: a passive type for making measurements without illuminating a measurement object with specific light or radio waves serving as an aid for measurement, and an active type for illuminating a measurement object with light, sound waves, or radio waves to utilize the resulting information for measurement.

Heretofore, many methods for making three-dimensional measurements by illuminating a measurement object with a pattern of laser light have been suggested and put into practical use. However, because laser light is likely to have adverse effects on the human body, these methods are difficult to apply to the human body. For example, Patent Document 1 describes a three-dimensional measuring method which has been improved by reducing, for example, the intensity of laser light as much as possible. However, a reduction in the intensity of laser light, in turn, requires an increase in the time of exposure to it, thereby resulting in the total amount of laser light being increased. Accordingly, it is desired to establish a three-dimensional measuring method for the human body without using a laser.

An example of a human body shape measuring apparatus that employs an active three-dimensional measuring method without use of laser light is described in Non-Patent Document 1. This human body shape measuring apparatus utilizes a time series spatial coding method in which seven types of coded patterns of light (gray code patterns) formed by a stripe-shaped light shutter array are projected onto a measurement object to optically divide the object, thereby computing the coordinates of the measurement object on the principle of triangulation.

However, the human body shape measuring apparatus described in Non-Patent Document 1 requires multiple projections for a single measurement. Accordingly, a substantial number of projections are required for highly accurate measurements. For example, the time series spatial coding method used in the human body shape measuring apparatus described in Non-Patent Document 1 requires at least seven projections in order to provide an improvement in measurement accuracy by 1% in the direction of depth. In the measurement of a human body, the subject is difficult to keep still for a long time during the measurement, and thus it is preferable that the number of projections be reduced as much as possible to shorten the time required for three-dimensional measurements.

In this regard, to solve the aforementioned problems, the inventor and others have devised a three-dimensional measuring method based on a monochrome projection & color analysis technique (see Non-Patent Document 2). According to the monochrome projection & color analysis technique, a monochrome-based pattern of light is first projected onto a measurement object. Then, in order to obtain as much information as possible on the intensity of the reflected light, a digital camera is used to capture the projected (observed) pattern of light. The color channel of each pixel in the captured color projected pattern light image is analyzed to employ a color channel that provides the most intense reflection as the measurement channel of the corresponding pixel, thereby making up a digital image having a high intensity distribution. The direction angle of the projected pattern of light is determined from the intensity distribution of each individual pattern (stripe) which forms the projected pattern of light detected on the computation image, thereby computing the three-dimensional information on the measurement object.

[Patent Document 1] Unexamined Japanese Patent Publication No. 2003-11430.

[Non-Patent Document 1] Susumu Shibata, Koichiro Yamauchi, Yuji Nishio, Takashi Futagawa, and Yukio Sato, Proceedings of the 10th Symposium on Sensing via Image Information, Technical Committee on Sensing of Image Information, pp. 253-258, Jun. 9, 2004.

[Non-Patent Document 2] Genki Cho and Cunwei Lu, "3-D Image Measurement Techniques by Combination of MPCA and OIMP for Improvement of the Measurement Efficiency", Proceedings of the 10th Symposium on Sensing via Image Information, Technical Committee on Sensing of Image Information, pp. 53-58, Jun. 9, 2004.

BRIEF SUMMARY OF THE INVENTION

The monochrome projection & color analysis technique described in Non-Patent Document 2 can detect a pattern of light having many individual patterns of light by a single projection, and thus enables three-dimensional measurements in a shorter time and with better accuracy than the time series spatial coding method. However, the monochrome projection & color analysis technique described in Non-Patent Document 2 can determine three-dimensional information only on the measuring point of an individual pattern of light which takes on a relative maximum in the intensity distribution of the projected pattern of light on the digital image. Accordingly, the three-dimensional information may be such that it suffers a loss of information between an individual pattern of light and an adjacent individual pattern of light.

It is therefore an object of the present invention to provide a three-dimensional measuring apparatus, method, and program for acquiring a large quantity of information on a pattern of light by a single projection and highly accurate three-dimensional information at high speed.

A three-dimensional measuring apparatus of the present invention is characterized by including: pattern forming means for forming a pattern of light to be projected onto a measurement object; projecting means for projecting light of a pattern formed by the pattern forming means (hereinafter referred to as "pattern of light" or "pattern light") onto the measurement object; imaging means for capturing an image of the measurement object illuminated with the pattern of light; projected pattern light detection means for detecting on the image the pattern of light that has been projected (hereinafter referred to as "projected pattern of light" or "projected pattern light"); direction angle computing means for comparing the projected pattern of light and an original pattern of light to compute a direction angle of the projected pattern of light; dividing means for dividing the projected pattern of light at every cycle; phase value computing means for computing a phase value at a measuring point from the divided projected pattern of light; distance computing means for computing a depth distance of the measuring point from the computed phase value; and three-dimensional information computing means for computing three-dimensional information on the measurement object using the computed depth distance of the measuring point.

According to the three-dimensional measuring apparatus of the present invention, the pattern of light formed by the pattern forming means is projected onto the measurement object by the projecting means; the image of the measurement object illuminated with the pattern of light is captured by the imaging means; and the projected pattern of light is detected on the captured image by the projected pattern light detection means. It is therefore possible to detect a projected pattern of light having many individual patterns of light by a single projection. That is, it is possible to obtain a large quantity of projected pattern light information by a single projection. Additionally, the direction angle computing means computes the direction angle of each individual pattern of light in the projected pattern of light, and the dividing means divides the projected pattern of light at every cycle, so that the phase value at each measuring point of an individual pattern of light or a divided projected pattern of light is computed by the phase value computing means. Then, the computed phase value at each measuring point is provided in terms of the depth distance of each measuring point. This makes it possible to obtain three-dimensional information not only on one measuring point of each individual pattern of light in the projected pattern of light, at which the intensity distribution takes on a relative maximum, but also on each measuring point of an individual pattern of light. Thus, highly accurate three-dimensional information can be provided. Note that a pattern of light or a projected pattern of light is a collection of each individual pattern of light.

On the other hand, a three-dimensional measuring method of the present invention is characterized by including a pattern forming step of forming a pattern of light to be projected onto a measurement object; a pattern light projecting step of projecting a pattern of light formed by projecting means in the pattern forming step onto the measurement object; an imaging step of allowing imaging means to capture an image of the measurement object illuminated with the pattern of light; a projected pattern light detection step for detecting on the image the projected pattern of light; a direction angle computing step of comparing the projected pattern of light and an original pattern of light to compute a direction angle of the projected pattern of light; a dividing step of dividing the projected pattern of light at every cycle; a phase value computing step of computing a phase value at a measuring point from the divided projected pattern of light; a distance computing step of computing a depth distance of the measuring point from the computed phase value; and a three-dimensional information computing step of computing three-dimensional information on the measurement object using the computed depth distance of the measuring point.

Furthermore, a three-dimensional measuring program of the present invention allows a computer to serve as: pattern forming means for forming a pattern of light to be projected onto a measurement object; projected pattern light detection means for detecting a projected pattern of light formed by the pattern forming means on an image of the measurement object illuminated with the projected pattern of light; direction angle computing means for comparing the projected pattern of light and an original pattern of light to compute a direction angle of the projected pattern of light; dividing means for dividing the projected pattern of light at every cycle; phase value computing means for computing a phase value at a measuring point from the divided projected pattern of light; distance computing means for computing a depth distance of the measuring point from the computed phase value; and three-dimensional information computing means for computing three-dimensional information on the measurement object using the computed depth distance of the measuring point.

The three-dimensional measuring method and program of the present invention can provide the same operational effects as those of the aforementioned three-dimensional measuring apparatus of the present invention.

The pattern forming means of the three-dimensional measuring apparatus of the present invention preferably optimizes the intensity distribution of a pattern of light to form a combined pattern of optimum intensity. The optimum pattern forming means optimizes the intensity distribution of a pattern of light to form a combined pattern of optimum intensity. This allows for creating a combined pattern of optimum intensity with a high intensity distribution that maximizes the difference in intensity between each of the relative maximums of an individual pattern of interest and an adjacent individual pattern. The combined pattern of light of optimum intensity projected onto the measurement object allows a projected pattern of light obtained on an image of the measurement object captured by the imaging means to provide the maximized difference in intensity between each of the relative maximums of the individual pattern of light of interest and the adjacent individual pattern of light. Accordingly, it is possible to compute the direction angle of each individual pattern of light in the projected pattern of light with improved accuracy and divide the projected pattern of light at every cycle with high accuracy, thereby making three-dimensional measurements with further improved accuracy.

Additionally, the three-dimensional measuring apparatus of the present invention preferably includes intensity value correcting means for correcting the intensity value of a projected pattern of light detected by the projected pattern light detection means. The intensity value correcting means corrects the intensity value of the projected pattern of light detected by the projected pattern light detection means. This allows for performing three-dimensional measurements with high accuracy even on a measurement object whose color distribution or surface reflection property is not clear. That is, it is possible to make three-dimensional measurements in a short time with high accuracy not only on a human body, which has a generally uniform color distribution, but also even on an object which is colored with various colors.

Additionally, the three-dimensional measuring apparatus of the present invention preferably includes position correcting means for correcting the position of a measurement object in an image acquired by the imaging means. The position correcting means corrects the position of a measurement object in an image acquired by the imaging means. This makes it possible to make three-dimensional measurements with high accuracy even on a measurement object other than a stationary object. That is, it is possible to make three-dimensional measurements in a short time with high accuracy on a human or an animal for which it is difficult to completely keep still during measurements.

Additionally, the three-dimensional information computing means of the three-dimensional measuring apparatus of the present invention preferably computes the spatial coordinates, distance, angle, area or volume of the measurement object. Since the three-dimensional information computing means computes the spatial coordinates, distance, angle, area or volume of a measurement object, the three-dimensional measuring apparatus of the present invention can be used to obtain various quantities of information on the measurement object.

Furthermore, the pattern that is used with the three-dimensional measuring apparatus of the present invention is preferably formed in the shape of stripes. Since the pattern is formed in the shape of stripes, the intensity distribution of a projected pattern of light that has been obtained by projecting this pattern of light for use with analysis can be readily analyzed as a sine wave. Additionally, in this case, the individual pattern of light indicates each stripe that forms a pattern of light and a projected pattern of light.

ADVANTAGES OF THE INVENTION (1) The pattern of light formed by the pattern forming means is projected onto a measurement object by the projecting means, an image of the measurement object illuminated with the pattern of light is captured by the imaging means, and a projected pattern of light is detected on this image by the projected pattern light detection means. It is thus possible to obtain a large quantity of information on a projected pattern of light by a single projection. Additionally, the direction angle computing means computes the direction angle of each individual pattern of light in the projected pattern of light, and the dividing means divides the projected pattern of light at every cycle. The phase value computing means computes the phase value at each measuring point of an individual pattern of light or a divided projected pattern of light, and the computed phase value at each measuring point is converted into the depth distance of each measuring point. It is thus possible to obtain three-dimensional information not only on one measuring point, at which the intensity distribution of each individual pattern of light in the projected pattern of light takes on a relative maximum, but also on each measuring point of an individual pattern of light. Thus, highly accurate three-dimensional information can be provided.

(2) The combined pattern of optimum intensity created by the optimum pattern forming means is a pattern of light with a high intensity distribution that maximizes the difference in intensity between each of the relative maximums of an individual pattern of interest and an adjacent individual pattern. Accordingly, the combined pattern of light of optimum intensity projected onto the measurement object allows a projected pattern of light obtained from an image of the measurement object captured by the imaging means to provide the maximized difference in intensity between each of the relative maximums of the individual pattern of light of interest and the adjacent individual pattern of light. It is thus possible to compute the direction angle of an individual pattern of light with improved accuracy and divide the projected pattern of light at every cycle with high accuracy. Accordingly, it is possible to make three-dimensional measurements with further improved accuracy.

(3) The intensity value correcting means corrects the intensity value of the projected pattern of light detected by the projected pattern light detection means. This allows performing three-dimensional measurements in a short time with high accuracy even on a measurement object whose color distribution or surface reflection property is not clear.

(4) The position correcting means corrects the position of a measurement object in an image acquired by the imaging means. This makes it possible to make three-dimensional measurements in a short time with high accuracy even on a measurement object other than a stationary object.

(5) The three-dimensional information computing means computes the spatial coordinates, distance, angle, area, or volume of a measurement object, and thus various types of information on the measurement object can be obtained.

(6) Since the pattern that is used with the three-dimensional measuring apparatus of the present invention is formed in the shape of stripes. It is thus possible to readily analyze, as a sine wave, the intensity distribution of a projected pattern of light used for analysis.

EXPLANATION OF REFERENCE NUMERALS

Figure 1:
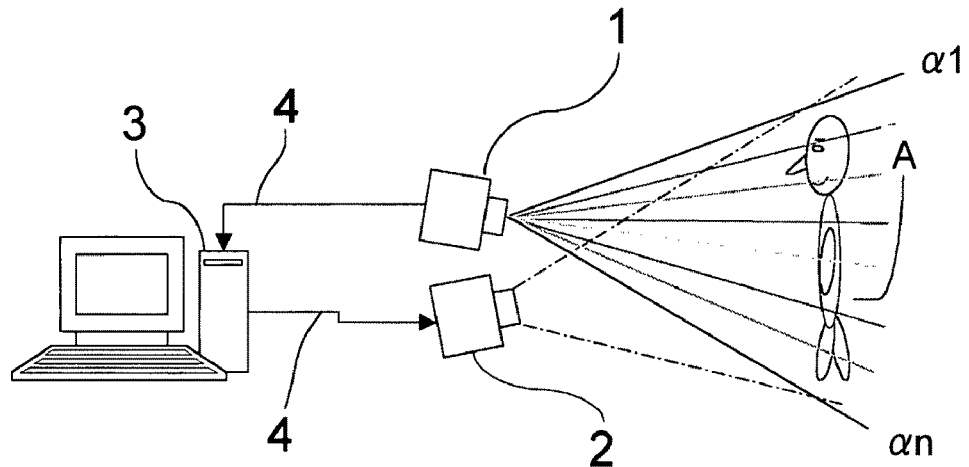
FIG. 1 is a view illustrating the entire configuration of a three-dimensional measuring apparatus according to an embodiment.

1: Pattern projector
2, 2a, 2b, 2c: Camera
3: Computer
4: Transmission cable
10: Storage means
11: Initial pattern forming means
12: Optimum pattern forming means
13: Extracting means
14: Projected pattern light detection means 15: Correcting means
16: Direction angle computing means
17: Dividing means
18: Phase value computing means
19: Distance computing means
20: Three-dimensional information computing means
21: Output means

DETAILED DESCRIPTION OF THE INVENTION

Figure 2:
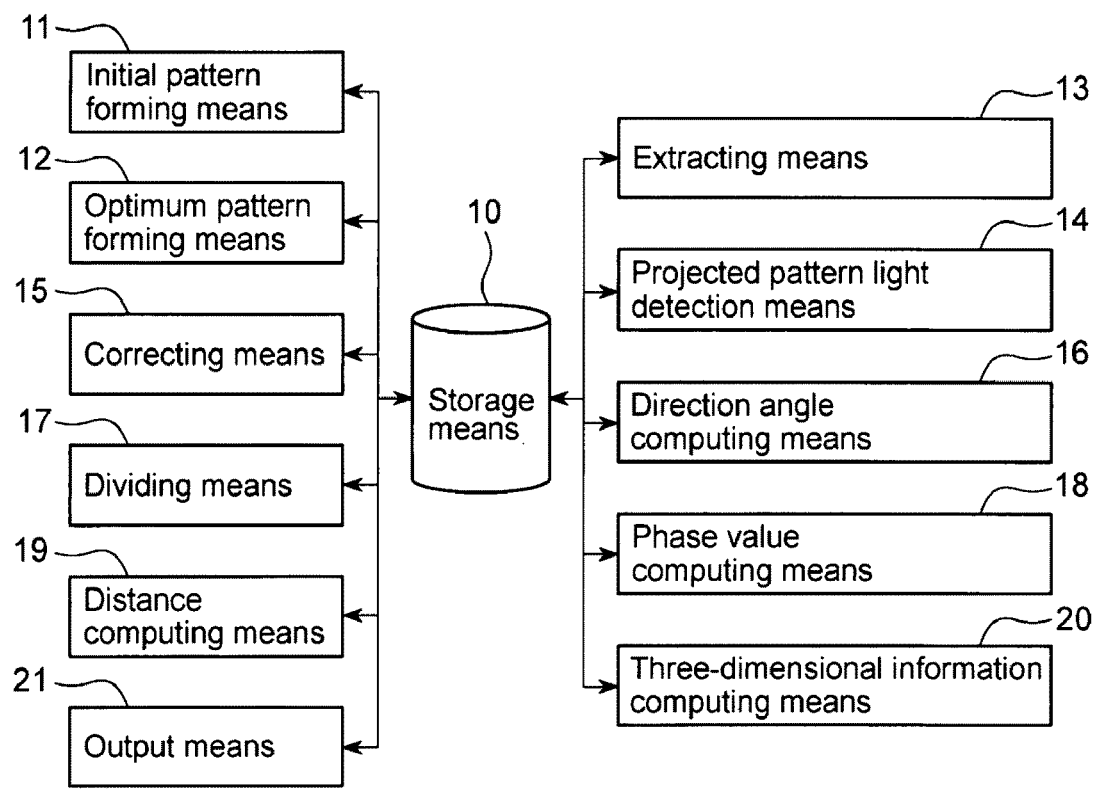
FIG. 2 is a block diagram illustrating the detailed configuration of the three-dimensional measuring apparatus according to the present embodiment.

A description will now be given regarding a three-dimensional measuring apparatus according to an embodiment of the present invention with reference to the drawings. FIG. 1 is a view illustrating the entire configuration of a three-dimensional measuring apparatus according to the present embodiment. FIG. 2 is a block diagram illustrating the detailed configuration of the three-dimensional measuring apparatus of FIG. 1.

As shown in FIG. 1, the three-dimensional measuring apparatus of the present embodiment is configured to include a pattern projector 1 serving as projecting means for projecting a pattern of light onto a measurement object A; a camera 2 serving as imaging means for capturing an image of the measurement object A illuminated with the pattern of light; and a computer 3 for processing data on the image captured by the camera 2. A transmission cable 4, which is capable of transmitting each data, connects the pattern projector 1 and the computer 3, and the camera 2 and the computer 3.

The pattern projector 1 acts as a device for converting pattern data formed by the computer 3 into a pattern of light, which is in turn projected onto the measurement object A. For example, a simple commercially-available apparatus such as a liquid crystal projector or DLP (Digital Light Processing (trade mark)) projector can be used. The camera 2 is a digital camera. It should be appreciated that the camera 2 may be of any type such as 8-bit, 12-bit, 3CCD, or 1CCD, so long as it is a digital camera.

As shown in FIG. 2, by executing a three-dimensional measuring program (not shown), the computer 3 functions as: storage means 10 for storing data on an image transmitted from the camera 2 and a computed result provided by each means to be listed below; extracting means 13 for acquiring an image from the storage means 10 to extract the measurement object A; projected pattern light detection means 14 for acquiring an image from the storage means 10 to detect a projected pattern of light; correcting means 15 serving as position correcting means and intensity value correcting means for correcting the position of the measurement object A extracted from the image by the extracting means 13 and for correcting the intensity value of the projected pattern of light detected by the projected pattern light detection means 14; direction angle computing means 16 for comparing the projected pattern of light with a projected pattern of light having an intensity value corrected by the correcting means 15 to compute the direction angle of each individual pattern of light in the projected pattern of light; dividing means 17 for dividing the projected pattern of light at every cycle; phase value computing means 18 for computing the phase value at each measuring point from an individual pattern of light or a projected pattern of light divided by the dividing means 17; distance computing means 19 for computing the depth distance of a measuring point from the phase value computed by the phase value computing means 18; three-dimensional information computing means 20 for computing three-dimensional information on the measurement object A from the depth distance of the measuring point computed by the distance computing means 19; and output means 21 for outputting the three-dimensional information computed by the three-dimensional information computing means 20.

Additionally, by executing the aforementioned three-dimensional measuring program, the computer 3 acts also as initial pattern forming means 11, and optimum pattern forming means 12 for optimizing the intensity distribution of a pattern of light to form a combined pattern of optimum intensity as pattern forming means for forming a pattern of light to be projected onto the measurement object A.

The initial pattern forming means 11 and the optimum pattern forming means 12 store a formed initial pattern in the storage means 10. Additionally, the extracting means 13, the projected pattern light detection means 14, the correcting means 15, the direction angle computing means 16, the dividing means 17, the phase value computing means 18, the distance computing means 19, and the three-dimensional information computing means 20 acquire necessary information from the storage means 10 as well as store results in the storage means 10. The output means 21 outputs three-dimensional information acquired from the storage means 10.

The initial pattern forming means 11 forms a corner-to-corner projection pattern of uniform intensity with no stripes. The optimum pattern forming means 12 maximizes the difference in intensity between each of the relative maximums of an individual pattern of interest and an adjacent individual pattern, thereby optimizing the intensity distribution of a projected pattern of light to form a combined pattern of optimum intensity.

The extracting means 13 acquires an image of the measurement object A illuminated with a pattern of light from the storage means 10 to extract the measurement object A. The projected pattern light detection means 14 acquires the image of the measurement object A illuminated with the pattern of light from the storage means 10 to detect the intensity distribution of the projected pattern of light. Additionally, the correcting means 15 acquires, from the storage means 10, an image of the measurement object A illuminated with an initial pattern of light and an image of the measurement object A illuminated with a combined pattern of light of optimum intensity, and compares these images to correct the position of the measurement object A between each of the images. Furthermore, using the intensity distribution of the projected pattern of light on the measurement object A illuminated with the combined pattern of light of optimum intensity formed by the optimum pattern forming means 12 and the intensity distribution of the projected pattern of light on the measurement object A illuminated with the initial pattern of light of uniform intensity formed by the initial pattern forming means 11, the correcting means 15 corrects the intensity value of the projected pattern of light to obtain an intensity distribution without color distribution information on the measurement object.

The direction angle computing means 16 compares the relative maximums between each individual pattern intensity distribution of the combined pattern of light of optimum intensity which was projected onto the measurement object A and each individual pattern intensity distribution of the projected pattern of light having its intensity value corrected by the correcting means 15. Then, the direction angle computing means 16 determines the degree of confidence of whether an individual pattern of light of interest in the projected pattern of light is an expected individual pattern of light in the combined pattern of light of optimum intensity, thereby computing the direction angle of each pattern of light.

The dividing means 17 divides the projected pattern of light at every cycle based on the relative maximum and minimum of intensity values obtained from the intensity distribution of the projected pattern of light. Additionally, the phase value computing means 18 computes the phase value at a measuring point using the intensity value of an individual pattern of light or a projected pattern of light divided by the dividing means 17. Furthermore the distance computing means 19 computes the depth distance of each measuring point from the phase value at each measuring point computed by the phase value computing means 18.

The three-dimensional information computing means 20 computes the three-dimensional information on the measurement object A from the depth distance of each measuring point computed by the distance computing means 19. The three-dimensional information includes, for example, the spatial coordinates, distance, angle, area, and volume of the measurement object A.

The output means 21 displays the spatial coordinates, distance, angle, area, volume or the like of the measurement object A computed by the three-dimensional information computing means 20 on a display device connected to the computer 3, or prints them out as text files or drawing files.

Figure 3:
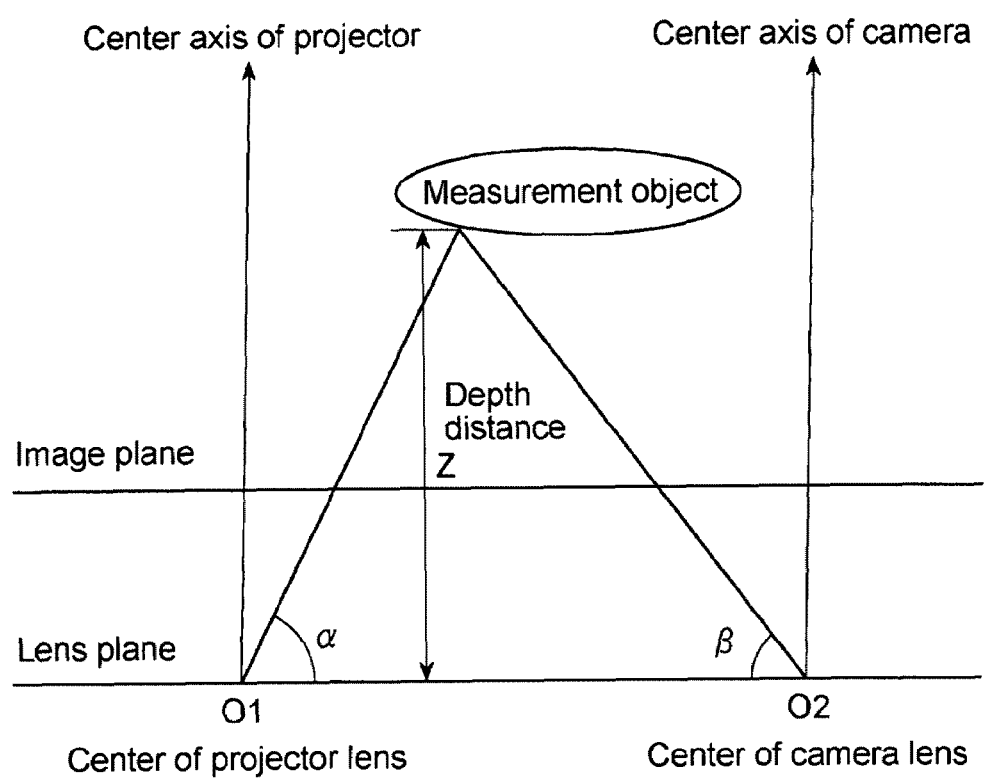
FIG. 3 is a view illustrating a geometric relationship in the three-dimensional measuring apparatus according to the present embodiment.
Figure 4:
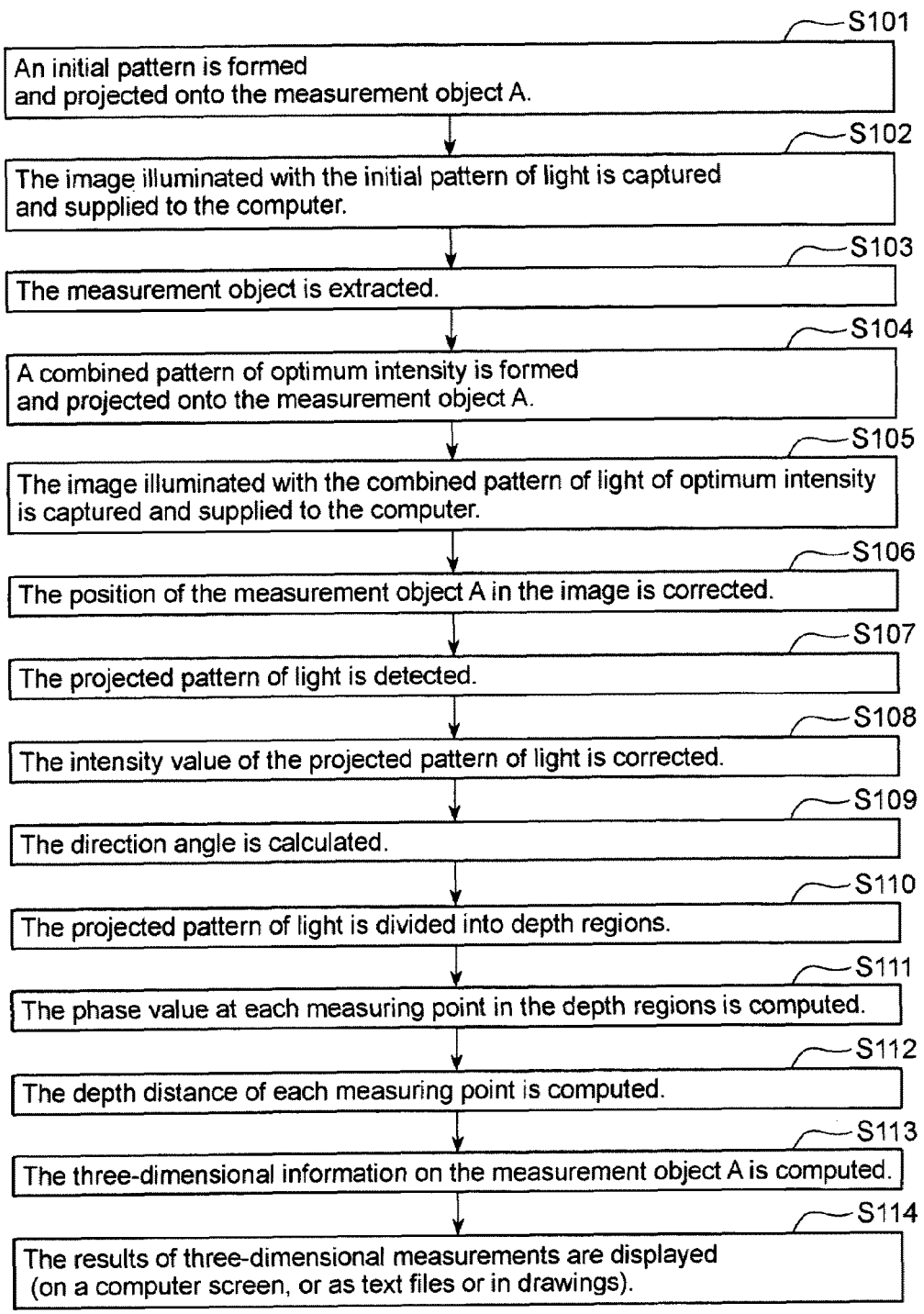
FIG. 4 is a flow showing a three-dimensional measurement using the three-dimensional measuring apparatus according to the present embodiment.
Figure 5A:
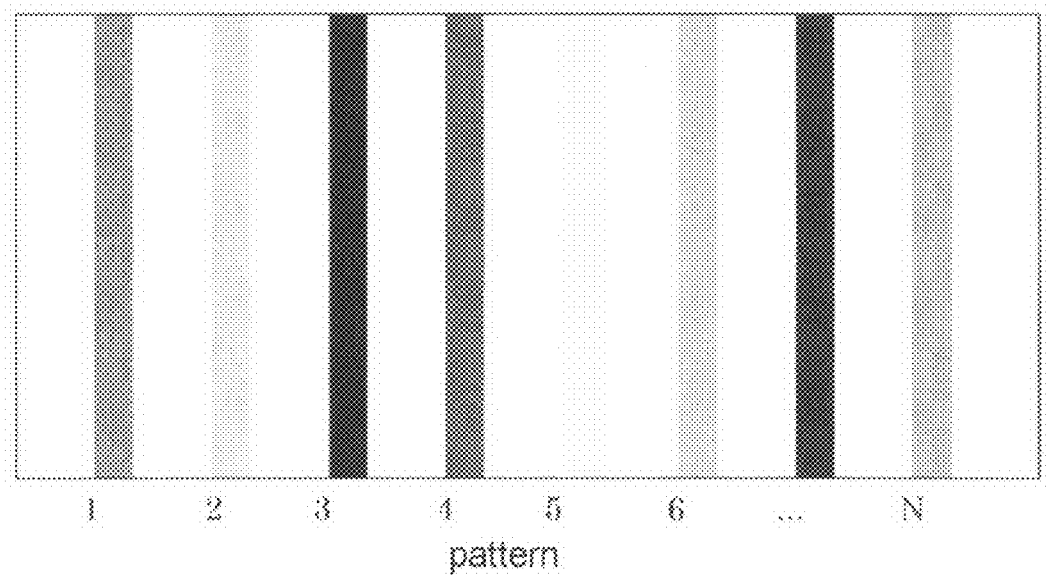
FIG. 5A is a view showing an exemplary pattern of combined patterns of light of optimum intensity.
Figure 5B:
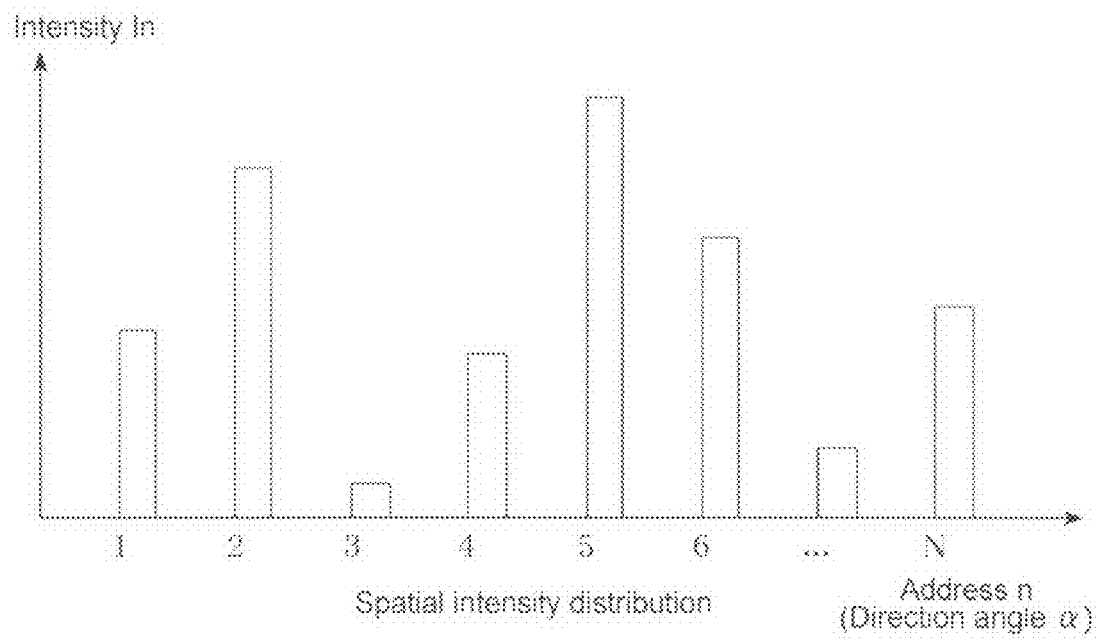
FIG. 5B is a view showing a spatial distribution of the pattern light intensity of FIG. 5A.
Figure 6:
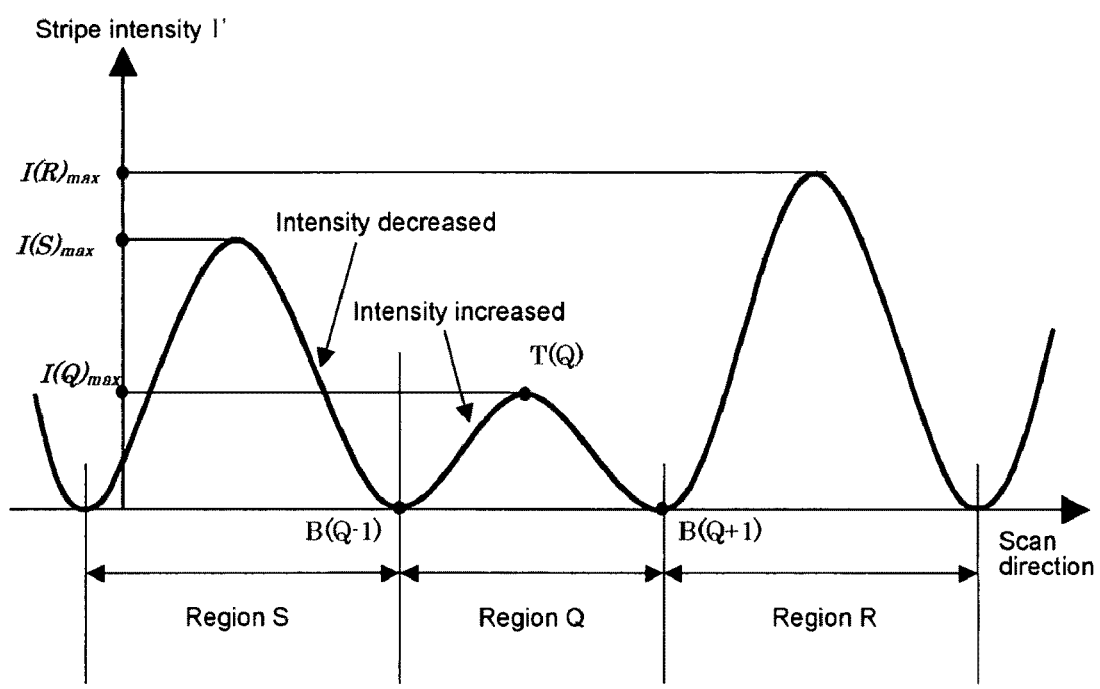
FIG. 6 is a view showing an intensity distribution of a projected pattern of light.

A description will now be given regarding the flow of measurement in the three-dimensional measuring apparatus of the present embodiment with reference to FIGS. 3 to 6. FIG. 3 is a view showing the geometric relation in the three-dimensional measuring apparatus of the present embodiment. FIG. 4 is a view showing the flow of three-dimensional measurement using the three-dimensional measuring apparatus of the present embodiment. FIG. 5A is a view showing an exemplary pattern of combined patterns of light of optimum intensity. FIG. 5B is a view showing a spatial distribution of the pattern light intensity of FIG. 5A. FIG. 6 is a view showing an intensity distribution of a projected pattern of light.

First, the pattern projector 1 and the camera 2 are located apart from each other by a certain distance so that they are geometrically related as shown in FIG. 3.

A projected pattern of light plays an important role in determining the measurement speed and accuracy of a three-dimensional measurement. The present embodiment employs a vertically striped monochrome pattern of light. Here, the direction angle representative of the direction of projection of a stripe is defined at regular intervals, and the position of each direction angle is referred to as the address of the stripe. As used in the present embodiment, the pattern of light has N stripes, the address of each stripe is defined as 1, 2, 3, ..., N, respectively. Additionally, the direction angle of each stripe is defined as $\alpha_1, \alpha_2, \alpha_3, \ldots, \alpha_N$, respectively. The intensity value of the $i^{th}$ stripe is defined as $I_i$.

First, the initial pattern forming means 11 of the computer 3 forms an initial pattern. The resulting initial pattern is stored in the storage means 10 as well as sent to the pattern projector 1 as initial pattern data via the transmission cable 4. The initial pattern data sent to the pattern projector 1 is projected onto the measurement object A as the initial pattern of light. The initial pattern of light is a corner-to-corner projection pattern of uniform intensity with no stripes. (step S101; see FIG. 4 for the subsequent steps.) The pattern formed by the initial pattern forming means 11 is the same as a light pattern of uniform intensity used for capturing typical images.

The camera 2 captures the initial pattern of light which has been projected by the pattern projector 1 onto the measurement object A. The captured image is sent to the computer 3 via the transmission cable 4 and then stored in the storage means 10 (step S102).

Then, using a pre-acquired image with only a background and the image of the measurement object A illuminated with the initial pattern of light, the extracting means 13 extracts the measurement object A by the background subtraction method (step S103).

The optimum pattern forming means 12 optimizes the intensity distribution of the projected pattern to form a combined pattern of optimum intensity as shown in FIG. 5A and FIG. 5B (step S104).

To form the combined pattern of optimum intensity, an evaluation function $d(I_1, I_2, \ldots, I_N)$ is defined as shown by Equation (1).

[Equation 1]

$$d(I_1, I_2, \ldots, I_N) = \sum_{i=M+1}^{N} \sum_{j=1}^{M} k_j |I_i - I_{i-j}| \qquad (1)$$

where $(I_1, I_2, \ldots, I_N)$ is the intensity distribution of the stripes of the projected light pattern, and $k_j$ is the weighting factor. Additionally, N is the total number of stripes of the projected pattern and M is the width of a filter used for application of the evaluation function.

The optimum pattern forming means 12 employs, as an optimum combination, such a combination that maximizes the value of the aforementioned evaluation function $d(I_1, I_2, \ldots, I_N)$, and then defines a pattern using this combination as the combined pattern of optimum intensity. The combined pattern of optimum intensity is stored in the storage means 10 and transmitted to the pattern projector 1 via the transmission cable 4. Note that when the optimum combination is difficult to determine, the second optimum combination may also be used which provides a sufficiently large value of $d(I_1, I_2, \ldots, I_N)$. It is to be understood that the optimum pattern forming means 12 of the present embodiment may also include the second optimum combination.

The camera 2 captures the combined pattern of light of optimum intensity that was projected onto the measurement object A by the pattern projector 1. The captured image is sent to the computer 3 via the transmission cable 4 and then stored in the storage means 10 (step S105).

Here, the correcting means 15 acquires, from the storage means 10, the image of the measurement object A illuminated with the initial pattern of light and the image of the measurement object A illuminated with the combined pattern of light of optimum intensity, and then compares these images, thereby correcting the position of the measurement object A using the method of least squares (step S106).

Then, the projected pattern light detection means 14 detects the intensity distribution of the projected pattern of light as shown in FIG. 6 from the images stored in the storage means 10 (step S107).

Here, the correcting means 15 corrects the resulting intensity value of the projected pattern of light by Equation (2) below (step S108).

[Equation 2]

$$I'(i, j) = k' \frac{I_l(i, j)}{I_0(i, j)} = k' \frac{M(n)O(x, y)}{P_0 O(x, y)} = kM(n) \qquad (2)$$

where (i, j) is the coordinates of the measuring point, I' is the corrected intensity value of the projected pattern of light on the measurement object A illuminated with the combined pattern of light of optimum intensity, $I_1$ is the intensity value of the projected pattern of light on the measurement object A illuminated with the combined pattern of light of optimum intensity, and $I_0$ is the intensity value of the projected pattern of light on the measurement object A illuminated with the initial pattern of light. M(n) is the intensity modulation function of the projected pattern of light, n is the stripe order of the pattern of light, O(x, y) is the surface reflectivity of the object, and k' and k are adjustment coefficients. Additionally, $P_0$ is the intensity value of the initial pattern of light.

Assume that the intensity distribution of the observed n stripes (n≦N) is expressed by $$S_i = (\bar{I}_1, \bar{I}_2; \ldots, \bar{I}_N)$$

and its address is $S_0 = (O_1, O_2, \ldots, O_N)$. The direction angle computing means 16 calculates the address $O_i$ (1≦i≦n) of each stripe or the position of the direction angle of each stripe as follows (step S108).

Step 1: To calculate each stripe address $O_i$ (1≦i≦n), first, the intensity $$\bar{I}_i$$

of the stripe of interest in the projected pattern of light on the measurement object A illuminated with the combined pattern of light of optimum intensity and the intensity $I_j$ (j=1, 2, ..., N) of the combined pattern of light of optimum intensity are compared with each other, and then j that satisfies Equation (3) is extracted as a candidate address of the stripe of interest with the set of them being defined as G.

[Equation 3]

$$|\bar{I}_i - I_j| < A \quad j=1, 2, 3, \ldots, N \qquad (3)$$

where A is a constant and in the present embodiment, takes on a value two to five times the minimum value of the difference in intensity between stripes.

Step 2: Then, using Equation (4), the likelihood $L_i(k)$ of the $i^{th}$ stripe address of interest being k (k being an element of G) is calculated.

[Equation 4]

$$L_i(k) = 1 - w_1 \frac{|\bar{I}_i - I_k|}{S} - w_2 \sum_{i=1}^{N_1} \frac{|\bar{I}_{i-j} - I_{k-j}|}{S} - w_3 \sum_{i=1}^{N_2} \frac{|\bar{I}_{i+j} - I_{k+j}|}{S} \qquad (4)$$

where $w_1$, $w_2$, and $w_3$ are constants, and $N_1 \leq M$, $N_2 \leq M$, and $S = |I_{max} - I_{min}|$.

Step 3: Then, using Equation (5) and Equation (6), the $i^{th}$ stripe address is determined.

[Equation 5]

$$L_i(t) = \max_{k \in G} \{L_i(k)\} \qquad (5)$$

[Equation 6]

$$O_i = t, \text{ when } L_i(t) > B \qquad (6)$$

where B is a constant.

Step 4: Suppose that the difference between the intensity $$\bar{I}_i$$

of the stripe of interest in the projected pattern of light on the measurement object A illuminated with the combined pattern of light of optimum intensity and the intensity $I_j$ of the combined pattern of light of optimum intensity is greater than a threshold value C as in $$(|\bar{I}_{i \pm j} - I_{i \pm j}|/S \geq C)$$

or, the calculated likelihood $L_i(t)$ is too small to satisfy Equation (6). In this case, it is determined that there is a stripe loss. In this case, assuming that there exists a loss of τ stripes, a comparison is made between the intensity $I_j$ of the combined pattern of light of optimum intensity, which takes a stripe loss into account, and the intensity $$\bar{I}_i$$

of the stripe of interest in the projected pattern of light on the measurement object A illuminated with the combined pattern of light of optimum intensity, thereby determining the address of the stripes. More specifically, k in Equation (4) is corrected as in Equation (7), and then Step 3 is performed again to compute the direction angle from the address of each stripe (step S109).

[Equation 7]

$$k' = k + \tau \qquad (7)$$

[Equation 8]

$$\tau = \begin{cases} 0, & \frac{|\bar{I}_{i-j} - I_{k-j}|}{S} < C \text{ and } \frac{|\bar{I}_{i+j} - I_{k+j}|}{S} < C \\ 1, & \frac{|\bar{I}_{i+j} - I_{k+1+j}|}{S} < C \text{ and } \frac{|\bar{I}_{i+j} - I_{k+j}|}{S} > C \\ -1, & \frac{|\bar{I}_{i-j} - I_{k-1-j}|}{S} < C \text{ and } \frac{|\bar{I}_{i-j} - I_{k-j}|}{S} > C \\ \ldots & \end{cases} \qquad (8)$$

where signs + and − of τ indicate that a stripe loss exists below and above the stripe of interest, respectively. The value of the threshold value C is appropriately set by a correction made by the correcting means 15.

Then, the dividing means 17 divides the projected pattern of light at every cycle based on the relative maximum and minimums of the intensity value obtained from the intensity distribution of the projected pattern of light as shown in FIG. 6. As such, the depth of the measurement object A is divided into several depth regions Q (step S110). The dividing means 17 defines the relative maximum of the intensity value of the $Q^{th}$ stripe, whose intensity value obtained through step S107 is I(Q), as the central position T(Q) of the $Q^{th}$ stripe, and then searches for the relative minimums B(Q−1) and B(Q+1) of the intensity values at either side of the stripe from that position. The region from B(Q−1) to B(Q+1) is the depth region Q of the $Q^{th}$ stripe. Such an operation is carried out on all the extracted stripes, thereby dividing the entire measurement object A into several depth regions.

Then, using Equation (9), the phase value computing means 18 bases the intensity value of a stripe in the projected pattern of light to compute its phase value β(i, j) in each of the resulting depth regions divided by the dividing means 17 (step S111).

[Equation 9]

$$\beta(i, j) = \begin{cases} \arccos \frac{2I'(i, j) - I(Q)_{max}}{I(Q)_{max}}; & B(i, j) = 1 \\ -\arccos \frac{2I'(i, j) - I(Q)_{max}}{I(Q)_{max}}; & B(i, j) = 0 \end{cases} \qquad (9)$$

Here, if the intensity of the stripe increases in the scan direction, then B(i, j)=0, whereas B(i, j)=1 if it decreases.

Using the phase value β(i, j) computed by the phase value computing means 18, the distance computing means 19 computes the depth distance Z(i, j) of the measurement object A by Equation (10) in each depth region (step S112).

[Equation 10]

$$Z(i,j)=Z(Q)+k\beta(i,j) \qquad (10)$$

where Z(Q) is the minimum value of the depth of region Q, and k is a constant.

The three-dimensional information computing means 20 computes the three-dimensional spatial coordinates of the entire measurement object A using the value obtained by the calculations in step S107 to step S112 for each pixel or each measuring point of each stripe in the projected pattern of light. This three-dimensional information includes spatial coordinates, distances, angles, areas, volumes or the like. Among other things, when the measurement object A is a human body, it is also possible to compute, for example, somatotypes (step S113).

All the measurement results can be displayed using the output means 21, for example, on the screen of a display device connected to the computer 3, or outputted using another output means 21, for example, by a printer, as a text file or a drawing file (step S114).

Figure 7:
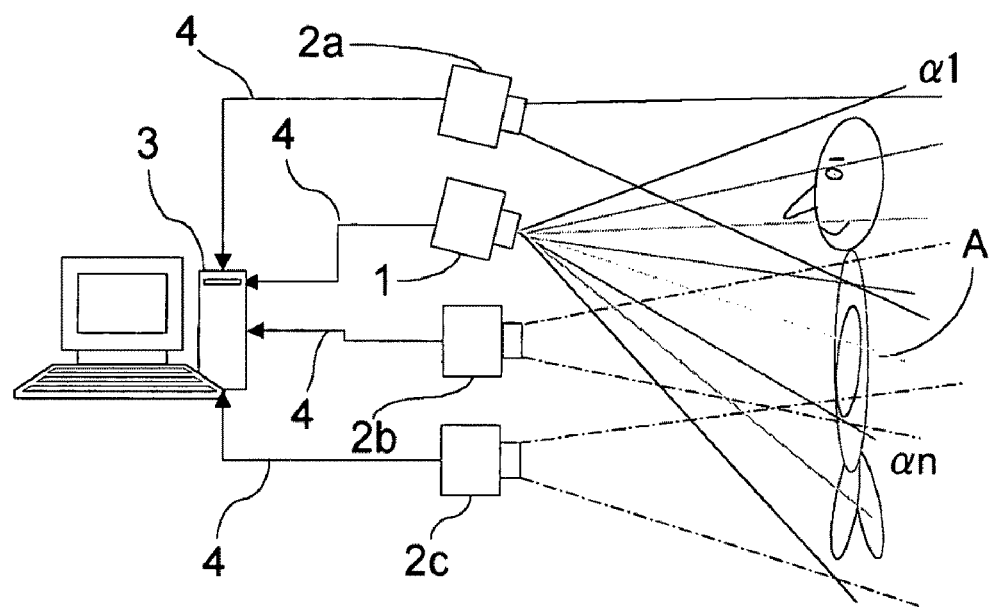
FIG. 7 is a view illustrating another embodiment of the present invention.
Figure 8:
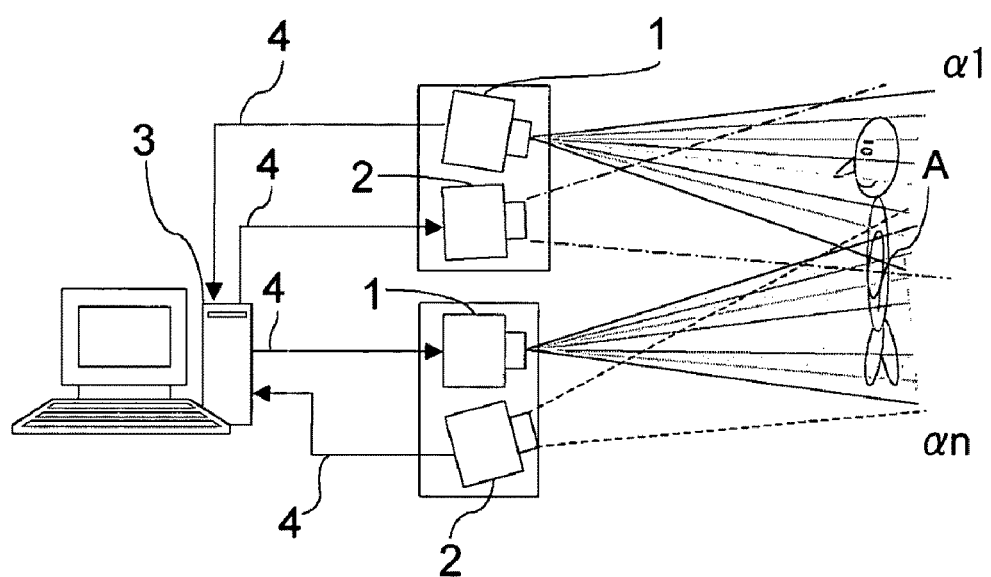
FIG. 8 is a view illustrating yet another embodiment of the present invention.

Note that, although the present embodiment employs the pattern projector 1 and the camera 2, one for each, in order to provide further improvements in measurement accuracy, several additional cameras 2a, 2b, 2c, . . . may also be used for local regions as shown in FIG. 7. This makes it possible to combine the detailed images of local regions into a high-resolution image of the measurement object A, thus allowing for computing three-dimensional information with higher accuracy using this image. Additionally, as shown in FIG. 8, the pattern projector 1 and the camera 2 may be employed as one set so that a plurality of these sets can be located around the measurement object A. This arrangement allows for implementing a wide range of measurements in a shorter time as well as for obtaining the three-dimensional information on the measurement object A along the entire circumference thereof in a short time with high accuracy. Among other things, when a human body is measured, measurements can be made without placing any burden on the subject.

Note that although the present embodiment employs a vertically striped pattern as the projected pattern of light; however, the invention is not limited thereto. It is also possible to employ linearly striped patterns such as horizontally or diagonally striped patterns; circular patterns such as of different-size concentric circles, circles, or ellipses; rectangular patterns such as of polygons; or patterns of complicated shapes such as grid-shaped patterns.

On the other hand, for a measurement of a stationary object, step S106 can be eliminated in which the correcting means 15 is used. This makes it possible to obtain the three-dimensional information on the measurement object A in a shorter time.

Figure 9A:
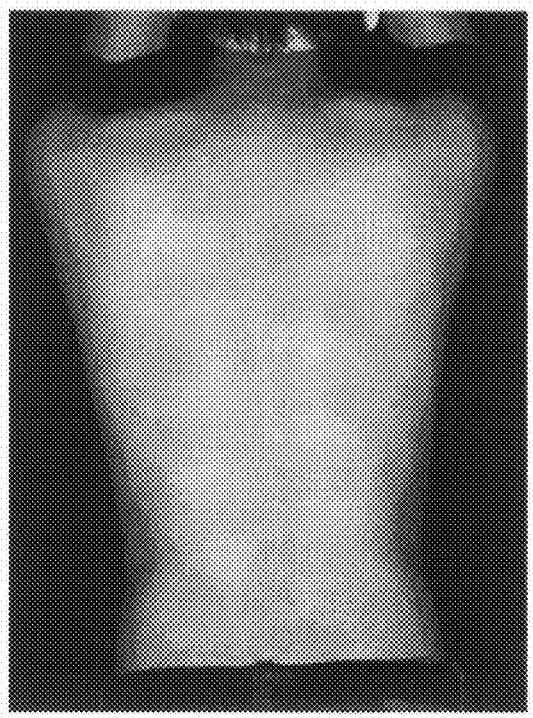
FIG. 9A is a view showing an image illuminated with an initial pattern of light.
Figure 9B:
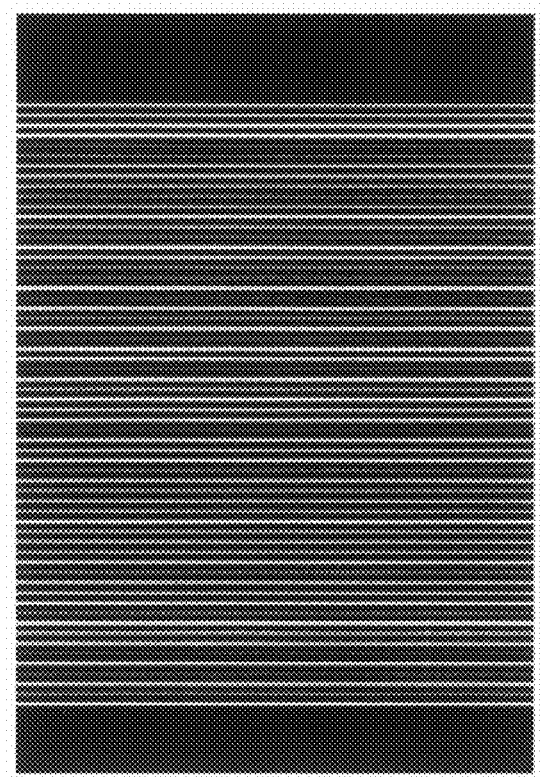
FIG. 9B is a view showing a combined pattern of optimum intensity.
Figure 9C:
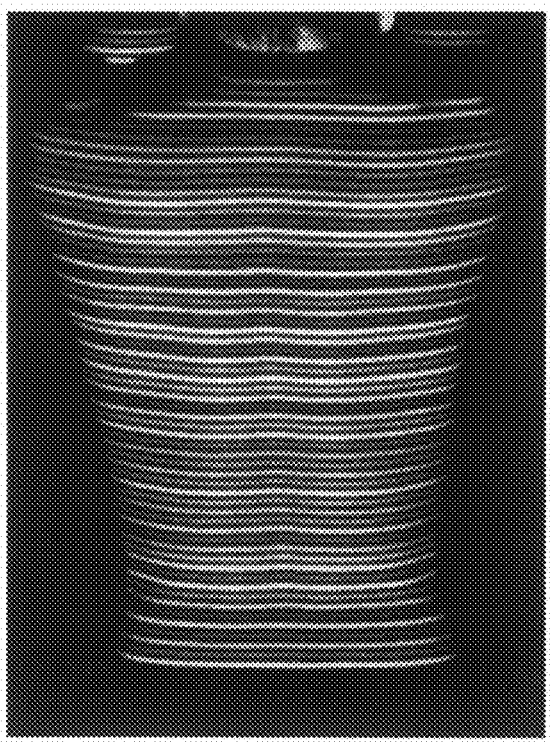
FIG. 9C is a view illustrating an image illuminated with a combined pattern of light of optimum intensity.
Figure 9D:
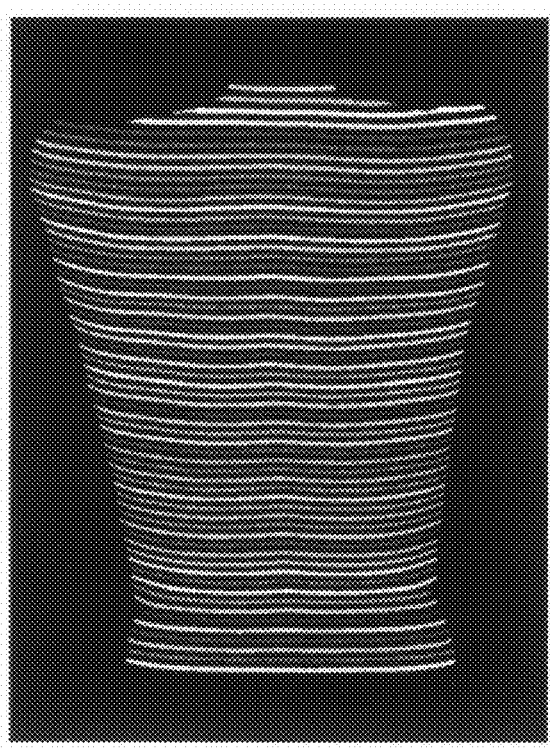
FIG. 9D is a view illustrating an image with its intensity corrected.
Figure 9E:
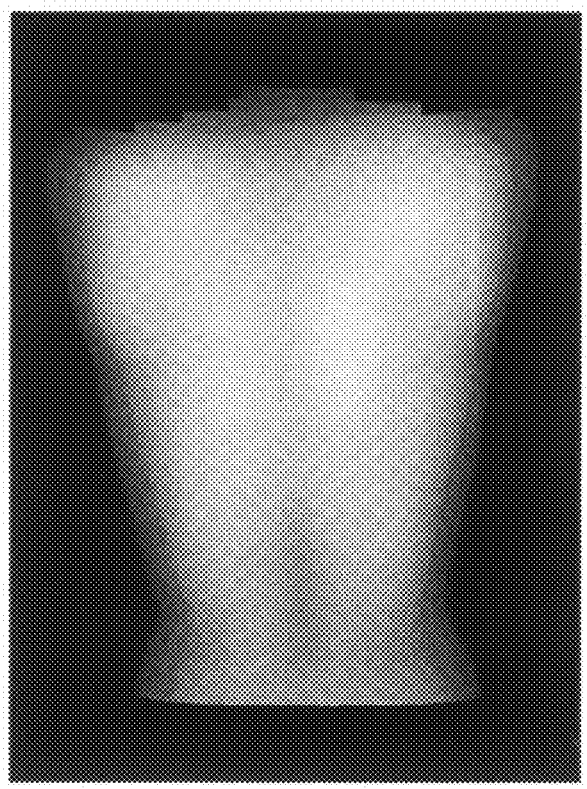
FIG. 9E is a view of an image showing the computed results of depth distances.
Figure 9F:
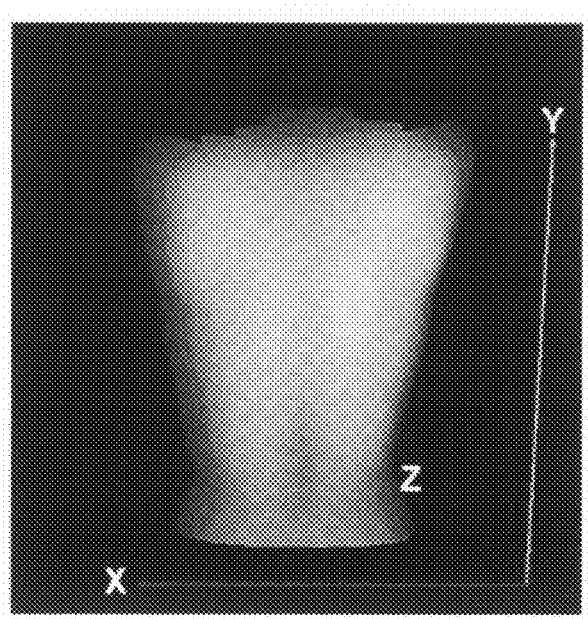
FIG. 9F is a graphical representation of three-dimensional information.

Now, those results that were obtained by three-dimensional measurements of a human body using the three-dimensional measuring apparatus of the present invention are shown in FIG. 9A to FIG. 9F. FIG. 9A shows an image illuminated with the initial pattern of light, FIG. 9B shows a combined pattern of optimum intensity, FIG. 9C shows an image illuminated with a combined pattern of light of optimum intensity, FIG. 9D shows an image with its intensity value corrected, FIG. 9E shows an image indicating the computed results of depth distances, and FIG. 9F is an image showing a graphical representation of three-dimensional information.

As shown in FIGS. 9A to 9F, good results were obtained in the three-dimensional measurements of a human body using the three-dimensional measuring apparatus of the present invention. The accuracy of three-dimensional measurement of the present invention depends on the calibration of the measurement system. However, since the recognition rate of the direction angle of each stripe is 100% in the case of 60 stripes, the measurement accuracy in the direction of depth (Z direction) is 98.3% or greater. On the other hand, when the measurement of those portions between the stripes is made by intensity/phase analysis, thereby ensuring a measurement accuracy of three or more levels of gray, the measurement accuracy in the direction of depth is 99.4% or greater. Furthermore, although the measurement accuracy in the X and Y directions varies depending on the resolution of the camera used or the like, it is possible to ensure a higher measurement accuracy than in the Z direction.

The three-dimensional measuring apparatus according to the present invention can advantageously provide a pattern of light having many individual patterns by a single projection as well as highly accurate three-dimensional information at high speed. In particular, highly accurate three-dimensional information can be obtained by a single projection, thereby making measurements in a shorter period of time. This allows the apparatus to be advantageously used as a three-dimensional measuring apparatus for a human body and to be thus made available specifically in such fields as medical care, apparel design, and development of living environments. Furthermore, since the three-dimensional information on a human body enables the measurement of a somatotype, the apparatus is also applicable to such fields as health care or diet control.

The invention claimed is:

1. A three-dimensional measuring apparatus for measuring a measurement object, the three-dimensional measuring apparatus comprising:

pattern forming means for forming a pattern for light to be projected onto the measurement object, said pattern comprising a combination of N individual patterns having an intensity Ii (i=1, 2, 3, . . . , N), respectively, said combination including a pattern employing either an optimal combination which provides a maximum difference in an intensity of the relative maximums between a target individual pattern and an individual pattern adjacent thereto, or a second optimal combination which provides a sufficiently large difference in an intensity of the relative maximums between a target individual pattern and an individual pattern adjacent thereto;

projecting means for projecting a pattern of light in the pattern formed by the pattern forming means onto the measurement object;

imaging means for capturing an image of the measurement object illuminated with the pattern of light;

projected pattern light detection means for detecting the projected pattern of light on the image;

direction angle computing means for comparing the projected pattern of light and an original pattern of light to compute a direction angle of the projected pattern of light;

dividing means for dividing the projected pattern of light at every cycle;

phase value computing means for computing a phase value at a measuring point from the divided projected pattern of light;

distance computing means for computing a depth distance of the measuring point from the computed phase value; and three-dimensional information computing means for computing three-dimensional information on the measurement object using the computed depth distance of the measuring point.

2. The three-dimensional measuring apparatus according to claim 1, further comprising intensity value correcting means for correcting an intensity value of a projected pattern of light detected by the projected pattern light detection means.

3. The three-dimensional measuring apparatus according to claim 1, further comprising position correcting means for correcting the position of a measurement object in an image acquired by the imaging means.

4. The three-dimensional measuring apparatus according to claim 2, further comprising position correcting means for correcting the position of a measurement object in an image acquired by the imaging means.

5. The three-dimensional measuring apparatus according to claim 1, wherein the three-dimensional information computing means computes spatial coordinates, distance, angle, area or volume of the measurement object.

6. The three-dimensional measuring apparatus according to claim 2, wherein the three-dimensional information computing means computes spatial coordinates, distance, angle, area or volume of the measurement object.

7. The three-dimensional measuring apparatus according to claim 3, wherein the three-dimensional information computing means computes spatial coordinates, distance, angle, area or volume of the measurement object.

8. The three-dimensional measuring apparatus according to claim 4, wherein the three-dimensional information computing means computes spatial coordinates, distance, angle, area or volume of the measurement object.

9. The three-dimensional measuring apparatus according to claim 1, wherein the pattern is formed in the shape of stripes.

10. The three-dimensional measuring apparatus according to claim 2, wherein the pattern is formed in the shape of stripes.

11. The three-dimensional measuring apparatus according to claim 3, wherein the pattern is formed in the shape of stripes.

12. The three-dimensional measuring apparatus according to claim 4, wherein the pattern is formed in the shape of stripes.

13. A three-dimensional measuring method for measuring a measurement object, the three-dimensional measuring method comprising:

a pattern forming step of forming a pattern for light to be projected onto the measurement object, said pattern comprising a combination of N individual patterns having an intensity Ii (i=1, 2, 3, . . . , N), respectively said combination including a pattern employing either an optimal combination which provides a maximum difference in an intensity of the relative maximums between a target individual pattern and an individual pattern adjacent thereto, or a second optimal combination which provides a sufficiently large difference in an intensity of the relative maximums between a target individual pattern and an individual pattern adjacent thereto;

a pattern light projecting step of projecting a pattern of light in the pattern formed in the pattern forming step onto the measurement object;

an imaging step of capturing an image of the measurement object illuminated with the pattern of light;

a projected pattern light detection step of detecting the projected pattern of light on the image;

a direction angle computing step of comparing the projected pattern of light and an original pattern of light to compute a direction angle of the projected pattern of light;

a dividing step of dividing the projected pattern of light at every cycle;

a phase value computing step of computing a phase value at a measuring point from the divided projected pattern of light;

a distance computing step of computing a depth distance of the measuring point from the computed phase value; and a three-dimensional information computing step of computing three-dimensional information on the measurement object using the computed depth distance of the measuring point.

14. The three-dimensional measuring method according to claim 13, further comprising an intensity value correcting step of correcting an intensity value of a projected pattern of light detected in the projected pattern light detection step.

15. A computer-readable storage medium containing instructions for a three-dimensional measuring apparatus, the instructions for causing the three-dimensional measuring apparatus to execute:

a pattern forming step of forming a pattern for light to be projected onto a measurement object, said pattern comprising a combination of N individual patterns having an intensity Ii (i=1, 2, 3, . . . , N), respectively, said combination including a pattern employing either an optimal combination which provides a maximum difference in an intensity of the relative maximums between a target individual pattern and an individual pattern adjacent thereto, or a second optimal combination which provides a sufficiently large difference in an intensity of the relative maximums between a target individual pattern and an individual pattern adjacent thereto;

a projected pattern light detection step of detecting a projected pattern of light formed by a pattern forming means on an image of the measurement object illuminated with a projected pattern of light in the pattern formed in the pattern forming step;

a direction angle computing step of comparing the projected pattern of light and an original pattern of light to compute a direction angle of the projected pattern of light;

a dividing step of dividing the projected pattern of light at every cycle;

a phase value computing step of computing a phase value at a measuring point from the divided projected pattern of light;

a distance computing step of computing a depth distance of the measuring point from the computed phase value; and a three-dimensional information computing step of computing three-dimensional information on the measurement object using the computed depth distance of the measuring point.

16. The computer-readable storage medium containing instructions for a three-dimensional measuring apparatus according to claim 15, the instructions further for causing the three-dimensional measuring apparatus to execute an intensity value correcting step of correcting an intensity value of a projected pattern of light detected in the projected pattern light detection step.

* * * * *